Patented Mar. 13, 1934

1,951,133

UNITED STATES PATENT OFFICE 1,951,133

COMPOSITIONS OF MATTER AND PROCESS OF PREPARING SAME

Jean Hubert Louis De Bats, East Orange, N. J.

No Drawing. Application September 14, 1931, Serial No. 562,836

14 Claims. (Cl. 25—156)

This invention relates to a novel method or process of uniting particles of a given carbide together into homogeneous coherent masses of desired shape to form essentially pure carbide products. The invention further relates to the novel products so produced. The invention also pertains to silicides and the like, as well as carbides.

Hitherto, in the preparation of articles from carbides such as tungsten carbide, tantalum carbide, molybdenum carbide, chromium carbide and other carbides having a high abrasive or cutting power, it has been necessary to reduce the materials and add a desirable bonding material which is softer and usually of a more ductile material, such as nickel, cobalt or other metals. The mixtures were formed into appropriate shapes, compressed and sintered. Such bonded articles have shown defects such as chipping or spalling under certain conditions of operation.

Where clay or like earthy matters are used as bonding agents with the carbides, as in the fabrication of grinding wheels, crucibles and other articles, the baked clay or other earthy binding material is deficient in structural strength, and the articles made therefrom are structurally weaker than metal bonded articles.

The use of bonding agents of organic nature, such as rubber and the phenolic condensation products, has not improved the situation to any appreciable extent.

The silicides, borides, tellurides, etc., exhibit practically the same disadvantages in use as the carbides, and such silicides, borides, tellurides, etc., have also been formed into structural shapes in the novel manner herein as in the case of the carbides.

Owing to the heretofore apparent impossibility of directly agglomerating the carbides, silicides, borides, etc. particles into coherent, homogeneous masses by any process hitherto known to technology, it has heretofore been necessary to make use of some types of bonding agents as above noted, even though the resulting products were not uniformly satisfactory in the practice of certain work.

An object of the present invention is to provide a novel process for the preparation of homogeneous, coherent masses of carbides, silicides, borides, etc., in any desired form, and to thereby eliminate extraneous bonding agents.

Another object of this invention is to provide such an improved process, in which carbides, silicides, etc., are formed into homogeneous masses of any desired density and shape.

It is also an object of this invention to provide an improved process for the preparation of suitably formed coherent masses of carbides, silicides, etc., having a determined density, which process involves the use of temperature and pressure.

Yet another object of this invention is the provision of a plurality of novel products and articles of self-bonded carbides and/or silicides and the like.

These and other desirable objects and advantages of the present invention will be described in the accompanying specification, wherein certain preferred processes and resulting compositions are illustrative of the scope of the novel improvements of the present invention, it being understood that the said invention is not to be limited thereto, except as clearly limited in scope and application by the appended claims.

In its broad aspects the invention comprehends the reduction of carbides, silicides, and other like compounds, to a suitable degree of fineness for the result desired, and in many cases to the fineness of colloidal particles, and to then agglomerate such reduced particles into homogeneous coherent masses under suitable conditions of temperature and pressure to form the desired product for the use intended.

In the practical operation of the process of the present invention, a non-agglomerable material, such as tungsten-carbide, is ground to a fineness below 100 mesh and, in some instances, to a fineness of the order of colloidal particles. This fine grinding or pulverizing may be carried out in a rotating ball mill, or the like, the desired grinding of the particles usually being accomplished by their mutual rubbing action. By the use of a suitable wetting agent such as water, alcohol and the like, preferably alcohol, the particles are prevented from flowing over each other without mutual grinding, as often occurs in the case in the dry grinding of pigments, sand, flour, etc.

The degree of fineness of the resultant particles is usually a function of the time or duration of the grinding step, the longer the grinding period, usually the finer the resultant particles. A grinding period of sixty hours has been found to give a powdered tungsten carbide of a fineness appreciably exceeding 200 mesh, which product is suitable for the preparation of the homogeneously formed articles in one of their possible forms.

As will be described more in detail hereinafter, the degree of fineness, or particle size, of the intermediate product, has a distinct bearing on the density and ease of formation of the finished articles.

Excellent results in grinding have been obtained by the use of rubber-lined grinding or tumbling barrels or mills, although it will be appreciated that any suitable grinding apparatus may be used without departing from the spirit and scope of the present invention.

After the raw material has been reduced to a suitable state of fineness, it is formed into desired shapes and compressed, if desired, and thereafter heated in a suitable reducing or neutral atmosphere, if desired, to the temperature desired to influence cohesion at or above shrinkage temperature, and compressed to the final, finished form.

The pressure used in forming a desired article will be varied according to the fineness of the ground particles and to the desired density to be imparted to the finished product. Thus, it will be appreciated that a colloidally ground material will usually require less heat and pressure to secure a product of a given density than will the same material more coarsely ground. In other words, the density of the final product may be varied at will by suitably varying the fineness of the material and/or the heat and/or the pressure applied thereto.

Owing to the smallness and uniformity of particle size of the materials, the distribution of heat therethrough is quite rapid and uniform, so that the mass in a suitable state of division, is heated throughout as a unit. This uniform and rapid heating of the mass may be accomplished most expeditiously by the use of a suitable furnace.

The pressure required for the preparation of homogeneous masses of the materials treated may vary within wide limits between a few pounds per square inch up to a million pounds or more per square inch, depending, of course, upon the results desired. The particular pressure used in any given instance, will depend, as noted above, upon the density to be imparted to the finished product or article, and upon the degree of fineness of the intermediate product, or ground material, and upon the temperature. The heated mass is usually subjected to the desired pressure in a die mold of any determined configuration to give a finished article. The invention also comprehends the extrusion from the press mold, of wires, rods, ribbons, tubes and other desired shapes from the heated mass.

The products produced according to the process above set forth are homogeneous in every respect, and are characterized by a sharp cleavage along a line of fracture. This characteristic is evidence of the self or autogeneous bonding of the particles, as the same materials, when bonded by foreign substances, whether metallic, ceramic, or organic, are often characterized by uneven fracture, spalling and/or chipping.

The process of the present invention is applicable to a wide variety of materials, such as the refractory carbides or silicides, including tungsten carbide, silicon carbide, the carbides of chromium, vanadium, molybdenum and the like, as well as the borides and other refractory compounds. It is also applicable to less refractory carbides and similar compounds, such as the carbides of calcium and aluminum.

In the grinding or pulverization of the materials, care should be taken that the wetting agent chosen does not react therewith.

Referring particularly to the novel products herein, it will be noted that the carbides alone of a particular metal or the silicides, borides, tellurides, etc., when taken alone, i. e., without any bonding agents, may be made to the desired form and density to meet the desired use to which it may be put. Thus the novel products may be made to fit the function of their use, and to accomplish this end at the least cost while obtaining the best and most efficient structure of the product.

It will now be appreciated that there has been disclosed novel products of great value and wide scope of use and that there has also been disclosed a novel process for the preparation of the homogeneous coherent masses of materials which have hitherto required the use of a bonding agent to hold them in a desired organization or shape. The improved products of the autogeneously or self-bonded materials can be appreciably reduced in bulk without sacrificing operative efficiency due to the fact that bonding agents, after occupying a major portion of the bulk of the finished articles or products, are entirely eliminated.

It will also be noted that a desired product for a desired use may be readily produced by a satisfactory control of the fineness of the particles of the carbide, and by the proper regulation of temperatures and pressures employed to produce the final product.

While the foregoing description sets forth in general and by example illustration, the invention herein, it will be understood that various modifications and changes may be made but it is considered that such modifications and changes are within the scope of this invention as outlined by the subjoined claims.

What is claimed is:

1. The method of forming coherent masses of particles of a material, such as refractory carbides, and the like, capable of self-bonding, normally non-agglomerable compounds, comprising grinding said materials to particle sizes below 100 mesh diameter, assembling said particles, compressing said particles into a briquette, heating the briquette mass to temperatures greater than the shrinkage temperatures of said material, removing the heated mass to a press mold, and compressing the mass to the form of the mold.

2. The method of forming coherent masses of particles of a material, such as refractory carbides, and the like, capable of self-bonding, normally non-agglomerable compounds, comprising grinding said materials to particle sizes below 100 mesh diameter, assembling said particles, compressing said particles, heating the compressed mass to temperatures greater than the shrinkage temperatures of said material, removing the heated mass to a press mold, and compressing the mass to the form of the mold.

3. The method of forming coherent masses of particles of a material, such as refractory carbides, and the like, capable of self-bonding, normally non-agglomerable compounds, comprising grinding said materials to particle sizes below 100 mesh diameter, assembling said particles, compressing said particles, heating the compressed mass to temperatures greater than the shrinkage temperatures of said material, removing the heated mass to an extrusion mold, and extruding the mass from said mold.

4. The method of forming homogeneous, coherent masses of self-bonded materials, such as refractory carbides, and like normally non-agglomerable compounds, comprising grinding said materials to form uniformly sized particles below 100 mesh diameter, forming the so-treated materials into suitable molds, heating the molded mass to a point above the shrinkage temperature of the material, removing from the mold and compressing the mass while heated to form the desired article.

5. The method of forming homogeneous, coherent masses of self-bonded materials such as refractory carbides, and like normally non-agglomerable compounds, comprising grinding said materials for a period of sixty hours and above to form uniformly sized particles of at least 100 mesh diameter, down to and including particles of colloidal size, forming the so-treated materials into suitable molds, heating the molded mass to a point above the shrinkage temperature of the material, removing the mass from the molds, and compressing the mass while heated, to form the desired article.

6. The method of forming coherent homogeneous masses of self-bonded materials such as refractory carbides, and like normally non-agglomerable compounds, comprising grinding said materials for a period sixty hours and above to form uniformly sized particles of at least 100 mesh diameter down to and including particles of colloidal size, forming the so-treated materials into suitable molds, and heating the molded mass to a point above the shrinkage temperature of the material, and in a reducing atmosphere and applying a pressure to said heated mass whereby to coalesce the particles therein.

7. The method of forming coherent homogeneous masses of self-bonded tungsten carbide, comprising grinding tungsten carbide crystals to form uniformly sized particles of at least 100 mesh diameter down to and including particles of colloidal dimensions, forming the so-treated material into suitable molds and heating the molded mass to a point above the shrinkage temperature of the material, removing from the mold and compressing the mass while heated.

8. The method of forming coherent homogeneous masses of self-bonded tungsten carbide, comprising grinding tungsten carbide crystals for at least sixty hours, to form uniformly sized particles of at least 100 mesh diameter down to and including particles of colloidal dimensions, compressing the so-treated material into suitable molds, and heating the compressed, molded mass to a point above the shrinkage temperature of the material, removing from the mold and compressing the mass while heated.

9. As an article of manufacture, a homogeneous carbide in massive coherent form.

10. As an article of manufacture, a self-bonded homogeneous, and coherent carbide mass.

11. As an article of manufacture, a self-bonded and compressed carbide.

12. As an article of manufacture, homogeneous tungsten carbide in massive coherent form.

13. As an article of manufacture, self-bonded, homogeneous tungsten carbide.

14. As an article of manufacture, self-bonded and compressed tungsten carbide.

JEAN HUBERT LOUIS DE BATS.